United States Patent

Okuyama

[15] 3,659,870
[45] May 2, 1972

[54] LEVELLING VALVE ASSEMBLY

[72] Inventor: Teiji Okuyama, Kariya, Japan

[73] Assignee: Aisin Seiki Kabushiki Kaiha, Kariya, Japan

[22] Filed: Sept. 25, 1970

[21] Appl. No.: 75,517

[30] Foreign Application Priority Data

Sept. 26, 1969 Japan..................................44/77252

[52] U.S. Cl...........................280/124 F, 280/6 H, 137/595, 137/636.1
[51] Int. Cl........................................................B60g 17/00
[58] Field of Search....................280/124 F, 6, 6 H; 137/595, 137/636.1

[56] References Cited

UNITED STATES PATENTS

| 3,508,585 | 4/1970 | Kurichh | 280/124 F |
| 3,599,675 | 8/1971 | Slevenpiper | 137/636.1 |
| 3,490,495 | 1/1970 | Green | 137/636.1 |
| 3,140,725 | 7/1964 | Alfieri | 137/636.1 X |

Primary Examiner—Philip Goodman
Attorney—Sughrue, Rothwell, Mion, Zinn & Macpeak

[57] ABSTRACT

The levelling valve assembly controls the supply and discharge of air to and from a pneumatic spring by providing a valve operating lever supporting shaft separate from the drive shaft for converting the sensed variations of chassis height into a corresponding rotational movement with a damper device resiliently connected therebetween.

5 Claims, 8 Drawing Figures

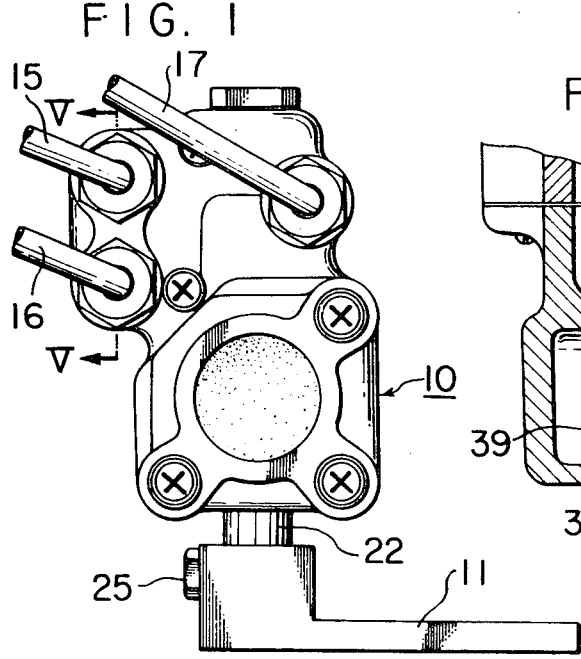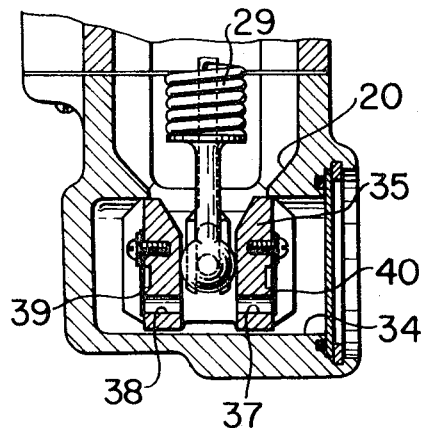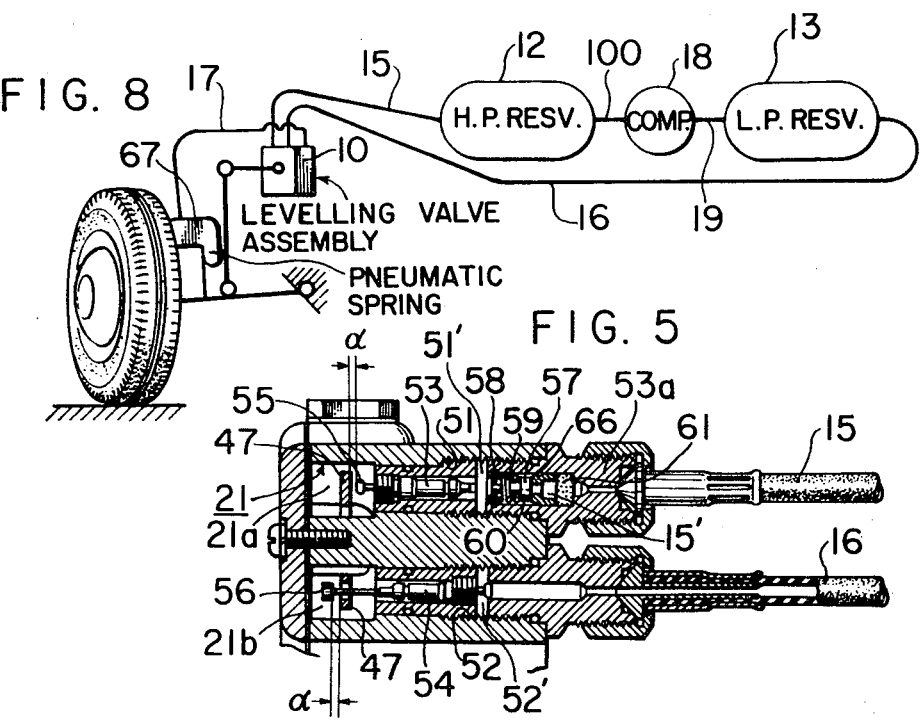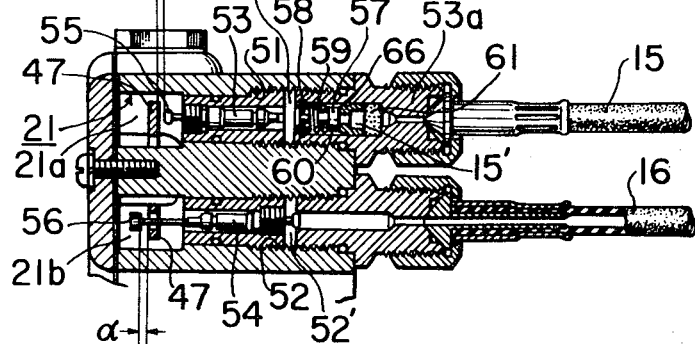

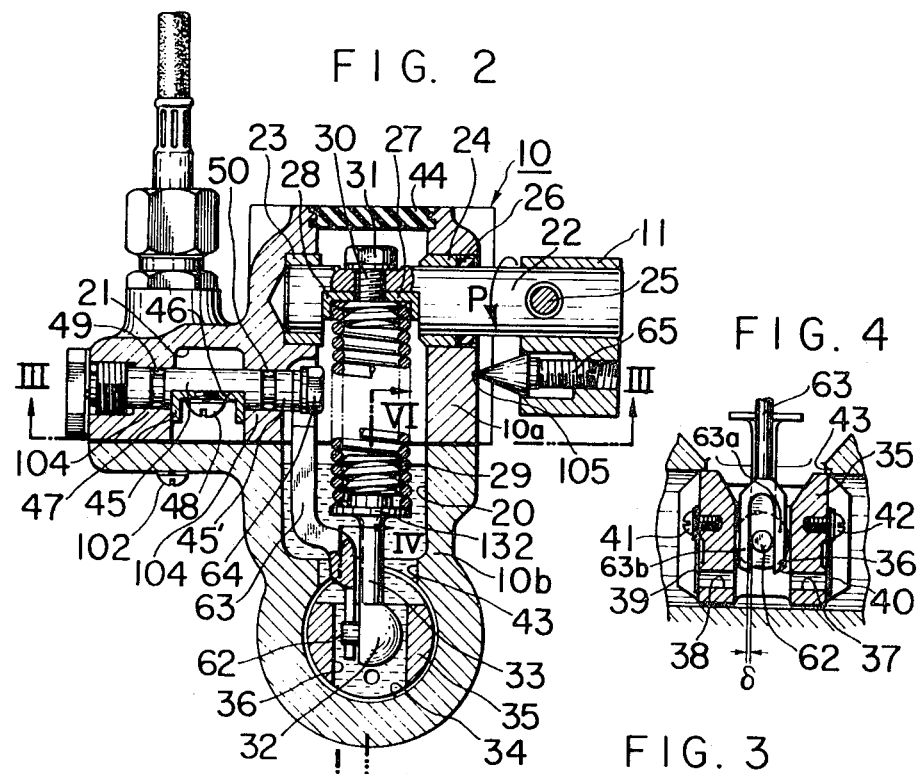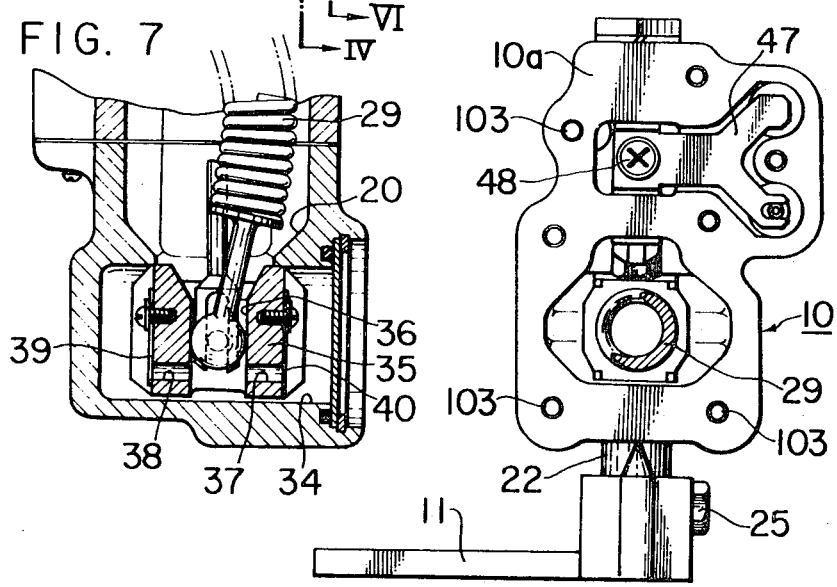

LEVELLING VALVE ASSEMBLY

This invention relates to improvements in and relating to a valve assembly which is arranged in a pneumatic system for a pneumatic vehicle suspension means and adapted for automatic adjustment of the chassis height from the axle of the vehicle, responsive to variation in the chassis deviated variation in the chassis height caused by increase or decrease of static load mounted on the chassis from a standardized and preset value of that height.

As commonly known among those skilled in the art, conventional leaf springs and coil springs, or briefly mechanical springs are being rapidly replaced by pneumatic springs, when seen at least in the field of automotive, railroad and the like powered vehicles, thanks to the superior performance of the pneumatic springs capable of providing a more pleasant travelling feelings to the passengers and a highly stabilized mounting capability of vehicle chassis and live loads thereon.

Since the pneumatic spring has conventionally a kind of bellows or diaphragm structure, it is possible to adjust the pneumatic pressure contained in the spring, and indeed, in response to occasional variation in the static loads on the chassis and for keeping the chassis height at a predetermined standard optimum value.

The levelling valve assembly to which the subject matter of the application belongs has been deviced hithertofore in a various and numerous ways. In general, however, this kind of levelling valve assembly comprises a control valve means having such a structure as controlling the supply and discharge of the high pressure air to and from the pneumatic spring, respectively. In addition, it comprises a damper means operatively connected with the valve control or operating means for retarding the valving action or the automatic chassis height adjusting movement so as to avoid too much sensitive or overtravel control, responsive to the cornering or to road surface uneveness, or the like minor influencing chassis height as frequently met during travel of the powered vehicle. The levelling valve assembly may further contain a further overtravel prevention means having a damper piston which absorbs a part of the chassis movement caused by static load variation and is adapted for transfer the sensed chassis height variation to the valve control mechanism.

It is a grave drawback frequently encountered with use of the conventional levelling valves that there is a substantial fluctuation in the return movement period of the chassis height variation-sensing and responsive motion transmitting-means embodied in that kind of valves.

It is the main object of the invention to provide an efficient levelling valve assembly capable of obviating substantially the aforementioned conventional drawback.

For this purpose and according to this invention, the levelling valve assembly is so designed and arranged that the valve operating lever supporting shaft and the drive shaft for converting the sensed variation of the chassis height into a corresponding rotational movement are separately provided and arranged, a damper means being inserted between said supporting shaft and said drive shaft. Said damper means comprises a damper piston which is connected through a resilient means with said drive shaft; and said supporting shaft and said resilient means through a connecting member. By adapting these measures, it is possible to provide a highly efficient levelling valve assembly capable of minimum frictional resistance and providing an accurate operation lag in the movement of the air supply and discharge valves and having a highly improved sealed condition.

These and further objects, features and advantages of the invention will appear more apparent when read the following detailed description by reference to the accompanying drawings illustrative of a preferred embodiment of the levelling valve assembly embodying the principles of the invention and shown only by way of example. In the drawings:

FIG. 1 is a plan view of the sole embodiment of the invention.

FIG. 2 is an axially sectional view of the embodiment shown in FIG. 1.

FIG. 3 is a side view of the main part of the levelling valve assembly when viewed from the side of a showing line III—III in FIG. 2, and upon removal of a certain part from the assembly for clear demonstration of the inner working parts thereof.

FIG. 4 is a sectional view taken substantially along a section line IV — IV shown in FIG. 2.

FIG. 5 is a sectional view taken substantially along a section line V — V shown in FIG. 1.

FIG. 6 is a sectional view taken substantially along a section line VI — VI shown in FIG. 2, wherein, however, the assembly is in its off-service position.

FIG. 7 is a similar view to FIG. 6, illustrative of the same assembly in its working position.

FIG. 8 is a schematic representation of a pneumatic suspension system to which the levelling valve assembly according to the invention is fitted.

Referring now to the accompanying drawings, the invention will be described in detail and by way of example.

In the drawings, numeral 10 denotes a main body of the levelling valve assembly according to this invention, said body being fixedly attached to the chassis of a powered vehicle, preferably an automotive vehicle, although not shown. In addition, the assembly is mechanically connected with the axle housing of the vehicle, not shown, through an elongated arm 11.

It will thus be seen that when the chassis height which means the mutual distance between the chassis and the axle housing is subjected modification, the arm 11 is turned to a larger or lesser degree, as will be more fully described hereinafter and a pneumatic communication control valve is thereby actuated.

The main body 10 is pneumatically connected through a piping 15, a high pressure air reservoir 12, a piping 100, a air compresser 18, a piping 19, a lower pressure air reservoir 13 and a further piping 16 in a circulating manner.

The main body 10 comprises two separate castings 10a and 10b detachably united together along a separating plane III—III by means of a plurality of fixing screws of which only one is shown representatively at 102 in FIG. 1. In FIG. 3, however, a plurality of tapped holes 103 serving for this purpose are seen at 103.

The main body 10 is formed with a vertical bore 20, when seen in FIGS. 2, 6 and 7, for mounting an overtravel mechanism to be described, and with a lateral inside space 21 for receiving an operating lever for a pneumatic communication control valve which will be more fully described hereinafter.

At an upper part of the vertical bore 20, a lateral or drive shaft 22 is rotatably mounted by means of a pair of bearing rings 23 and 24 which are fixedly positioned at the both sides of the bore 20 in FIG. 2. The lateral shaft 22 protrudes from the main body 10, said arm 11 being fixedly attached to the protruding end of the lateral shaft 22 by means of a fixing bolt 25. Around the shaft 22, a sealing ring 26 made of a resilient material such as rubber is sealingly provided in close proximity of the bearing ring 24 and in the outer wall part of the body element 10a.

The shaft 22 is formed at an intermediate point thereof in proximity of its inner end and in registration with the central axis of the vertical bore 20 with a substantially reduced part 27 to which a spring mount 28 is fixedly attached by means of a bolt 30 and a nut 31, the upper end of a closedly wound coil spring 29 abutting under pressure against the spring mount 28 and the lower end of said spring abutting on the mounting disc 132 rigidly formed on the upper end of a rod member 33. This rod member 33 extends vertically into the inside space of a lateral bore 36 formed through a damping piston 35 reciprocatably received in a cross bore 34 which is formed in the lower main body element 10b, when seen in FIG. 2. The lower end of the rod member 33 is enlarged, so as to form a semi-ball end 32. The cross bore 34 is kept in fluid communication with the lower end of the vertical bore 20 through an intermediate passage 43 formed into a neck.

The damping piston 35 is formed with a pair of longitudinal passages 37 and 38 as shown in FIGS. 4, 6 and 7, said passages being normally closed resiliently by respective flap valves 39 and 40 which are fixedly mounted at their respective root portions on the related end surfaces of the piston by respective fixing screws 41 and 42. The axial length of the piston 35 is so selected as being slightly longer than the diameter of the intermediate or necked passage 43. As seen from FIGS. 2, 4, 6 and 7, there is provided an appreciable diametral gap plays between the piston 35 and the inside wall surface of cross bore 34 for allowing a resistive passage of a high viscosity damping liquid contained in the bore 34, as will be more fully described hereinafter.

The upper end of the vertical bore 20 is tightly closed by a closure cover 44 made preferably of a synthetic resin for preventing escapement of splashed liquid particles from within the interior of the vertical bore 20 when the valve assembly is in its operating condition.

A further lateral bore 104 is bored in the upper body element 10a as seen in FIG. 2 in a crossing manner with the vertical bore 20 and kept in communication with the inside space 21 and a pin or support shaft 45 is received in the bore 104, the inner end of said pin projecting into the vertical bore 20. The pin 45 is formed at its intermediate point with a reduced and flattened portion 46 and a Y-lever 47 adapted for control of the pneumatic communication control means to be described is attached fixedly to said portion 46 by means of a fixing bolt 48. At the both sides of said flattened portion 46, the pin 45 is sealed off by means of resilient O-rings 49 and 50 for preventing any leakage of high pressure air from the space at 21 which space is filled with such air, as will be more fully described hereinafter.

The inside space 21 is divided into two compartments 21a and 21b which are in communication with lateral tapped bores 51 and 52, respectively, and valves 53 and 54 are held firmly in position in these bores 51 and 52, respectively. These bores are insulated from pneumatic communication with each other.

These valves 53 and 54 are provided with respective on-off control rods 55 and 56, respectively. These rods are so designed and arranged, as will be most clearly seen from FIG. 5, that they are slidingly controlled by the Y-lever 47 for performing on-off control of the related valves. Parts 51' and 52' of the lateral bores 51 and 52 constitute respective high pressure air chambers, one of which 51' is connected through a check valve 57 and piping 15 with the high pressure air reservoir 12.

The provision of this check valve 57 serves for the prevention of escapement of pressure air contained in the pneumatic spring 67, should there be a bursting of the piping 15 extending between the high pressure control valve 53 and the reservoir 12.

Check valve 57 comprises a male-threaded hollow body 53a, a spring mount 58 held firmly therein, spring 59, a valve disc 60 and a check valve seat member 66, said valve disc 60 closing normally the axial passage opening 15' bored through said member 66 and a filter disc 61 made of a sintered porous metal being provided in contact with the outer end of said seat member 66 for removal of entrained dust particles from the supplied high pressure air stream from the reservoir 12 through the piping 15.

To the inwardly projecting end 45' and a pin 62 fixedly attached to the enlarged semi-spherical end 32 of rod 33, a connecting rod 63 is connected with its both ends. More precisely, the upper end of said rod 63 is fixedly connected to the pin end 45' by means of a bolt 64. The lower end of said rod 63 is formed into a fork having arms 63a and 63b embracing the pin 62 with a certain idle gap "delta" specifically shown in FIG. 4.

A lock bolt 65 passes threadedly through the arm 11, as most clearly seen from FIG. 2, serving for adjustable setting of the valves 53 and 54 in their neutral position. For this purpose, valve rods 55 and 56 are preset to have predetermined relative gaps to lever 47 and then, by trial and error method, the neutral position of the lever is set for providing equal operational lags to the air supply and discharge valves. When this position has been set, the pointed tip end of lock bolt 65 is fixed in position by punching a small recess 105 into the outside wall of the upper body member 10a for engagement with the pointed lock bolt end.

For ready use of the above-mentioned apparatus, it is sufficient to equip the latter to a powered vehicle upon completion of the presetting of the chassis to a certain standardized height peculiar to a specific model of the vehicle, and then to release the lock bolt 65. In this way, the chassis can be maintained substantially always at the standardized and preset height valve, as will be more fully described hereinbelow.

The operation of the apparatus so far shown and described is as follows:

Now it is assumed that the chassis load is reduced and the chassis height is increased beyond a predetermined value, the shaft 22 which is connected through arm 11 with the axle housing will swivel a corresponding angle in the direction shown by a small arrow P in FIG. 2.

By this swivel movement of shaft 22, coil spring 29 is subjected forcibly to a deformation as shown in FIG. 7, a reaction being transmitted from the coil to damper piston 35 so as to urge the latter to shift rightwards. Since the axial passage 37 provided in the damper piston 35 is closed by flap valve 40, the viscous damping liquid filling the right-hand liquid chamber of the cylinder bore 34 is pressed out by this shifting movement of piston 35 through the small idle gaps formed between the bore and the piston into the vertical bore 20 and also into the damper piston bore 36. During passage of the damping liquid through the said small idle gaps, the liquid flow will naturally be subjected to a substantial fluid resistance which will retard the shifting movement of said damper piston.

During this rightward shift movement of the damper piston, the opposite passage opening 38 in the piston is opened by forcibly receding the related flap valve by action of the flowing damping liquid. Therefore, the part of the damping liquid confined in the piston bore 36 will flow into the left-hand liquid chamber of the bore 34, without subjecting to a considerable flow resistance.

With further small rightward shift of damper piston 35 against the said fluid resistance, the left-hand liquid chamber of cylinder bore 34 will become in full communication with the bore 20. Only under such operating condition, the connecting rod 63 which has had a predetermined idle gap delta relative to the pin 62 fixed on the lower end of spring-mounting rod 33 will follow after the shifting movement of damping piston 35.

Since the connection between the pin end 45' and the upper end of connecting rod 63 is made firmly, the pin 22 will precisely follow after the angular movement of connecting rod 63. At this stage, the Y-lever 47 will shift leftward when seen in FIG. 5, but, since there is a predetermined idle gap "alpha" between the lever 47 and the operating rod 56, the valve-operating lever 47 will move beyond the predetermined value "alpha," only when the damper piston 35 linked by connected with said lever. By this movement, the operating rod 56 is attracted and the air discharge valve 54 is opened. By this valving operation, a part of the pressure air contained in the pneumatic spring 67 will escape through the pipings 17 and 16 to the low pressure reservoir 13. Thus, the chassis height recovers its standard preset value.

When it is assumed that the chassis load is increased and the chassis height is reduced beyond the predetermined preset value, the shaft 22 will make a reversed turning movement relative to the case of the foregoing.

Therefore, the Y-shaped, valve control lever 47 will shift rightwards in FIG. 5, thereby operating rod 55 of compressed air supply valve 53 being pressed for opening the valve. A part of the high pressure air contained in the reservoir 12 will be delivered therefrom through piping 15, air filter 61, check valve 57, valve 53 and a further piping 17 to the pneumatic spring 67, thereby the chassis height being increased to the preset value.

Upon recovery of the chassis height to the standard preset value in the aforementioned way, air delivery and air discharge operations through the valve means must preferably be brought into stoppage.

When the time delay during the return movement of the damper piston from its shifted to its neutral position, the valve 53 or 54 will be kept open even after attainment of the standard chassis height, which results in an overadjustment.

In the arrangement according to the invention, the flap valves 39 and 40 will serve highly effectively for avoiding such overadjustment.

When the damper piston 35 initiates its return movement from its maximumly shifted position back to its neutral-one, either of these flap valves 39 or 40, which may be as the occasion desires it, will be automatically opened, and thus, a viscous flow of the damping liquid from piston bore 36 through the corresponding passage 37 or 38 to the left-hand or right-hand liquid chamber of the cylinder bore 34 will be subjected to almost no fluid resistance and in an easy way.

Therefore, the damper piston 35 will go back to its neutral position within a possible minimum period. Since, as mentioned above, there is a certain predetermined idle play "alpha" between the Y-lever 47 and valve-control rods 55;56 in their off-service stage, there will be soon established and maintained between these rods, on the one hand, and the lever 47 on the other upon return movement of the damper piston to its neutral position. Thus, valves 53 or 54 will be closed almost instantly. An overadjustment of chassis height can be substantially obviated in this manner.

In the arrangement according to this invention, the closedly wound spring acts practically as an overtravel mechanism which is capable of responding quickly and sensitively the variation in the chassis height and of obviating unavoidable fluctuation of the return lag in the above sence.

Since the overtravel mechanism is subjected to a possible smallest frictional resistance, the frequently met disadvantageous phenomena such as cornering, oversensitive response to chassis height variation in case of braking and accelerating the vehicle can substantially obviated.

The embodiments of the invention in which an exclusive property or privilege is claimed are as follows:

1. A levelling valve assembly comprising:
   a. a main body positioned between a vehicle chassis and a vehicle axle and connected pneumatically with a high pressure air reservoir, a low pressure reservoir and a pneumatic spring;
   b. a drive shaft mounted in part of bore means formed in said main body, a chassis height sensing arm being supported on one end of said shaft and adapted for conversion of chassis height variation into a corresponding angular movement;
   c. a supporting shaft for supporting a valve-operating lever, said shaft being mounted in said housing with one end thereof extending into said bore means;
   d. a control lever fixedly attached to said supporting shaft;
   e. control valve means comprising a discharge valve and a supply valve, said valves being adapted for being controlled by said control lever;
   f. a damping mechanism provided between said drive shaft and said supporting shaft;
   g. a piston slidably mounted within said damping mechanism;
   h. a resilient connecting member, one end of the latter being kept in engagement with said drive shaft and the opposite end being kept in engagement with said piston; and
   i. a connecting lever one end of which is attached to said supporting shaft and the opposite end of which is adapted for cooperation with said resilient connecting member.

2. Levelling valve assembly as claimed in claim 1, wherein said resiliently connecting member is a closedly wound coil spring.

3. Levelling valve assembly as claimed in claim 1, wherein said resilient connecting member is positioned normally with a certain predetermined idle gap relative to said connecting lever.

4. Levelling valve assembly as claimed in claim 1, wherein said supporting shaft for said control lever is exposed at its both ends to open atmosphere.

5. Levelling valve assembly as claimed in claim 1, wherein an air filter made of a sintered porous metal is inserted between an inlet for introducing the high pressure air and the air introducing valve provided and mounted in said main body.

* * * * *